United States Patent

[11] 3,536,109

[72] Inventors Irwin Ginsburgh
Morton Grove, and
Lawrence T. Wright, Homewood, Illinois
[21] Appl. No. 712,577
[22] Filed Dec. 18, 1967
Continuation-in-part of Ser. No. 457,221,
July 27, 1965, abandoned.
[45] Patented Oct. 27, 1970
[73] Assignee Standard Oil Company
Chicago, Illinois
a corporation of Indiana

[54] CONTROL MECHANISM FOR AUTOMATIC DISPENSING OF MOTOR FUEL
58 Claims, 3 Drawing Figs.
[52] U.S. Cl..................................................... 141/98,
137/234.6, 141/232, 141/248, 235/151
[51] Int. Cl..................................................... B67d 5/00
[50] Field of Search........................................ 137/234.6;
141/98, 231—233, 266, 279, 284; 222/192;
235/151, 151.2, 151.34

[56] References Cited
UNITED STATES PATENTS
| | | | |
|---|---|---|---|
| 2,966,248 | 12/1960 | Armbruster................. | 194/13 |
| 3,095,020 | 6/1963 | Darwin........................ | 137/234.6X |
| 3,199,727 | 8/1965 | Romanowski................ | 235/151.34X |

*Primary Examiner*—Laverne D. Geiger
*Assistant Examiner*—Edward J. Earls
*Attorneys*—Arthur G. Gilkes, William T. McClain and William B. Ross

ABSTRACT: A control mechanism used as part of a system for automatically fueling motor vehicles. The control mechanism includes means for identifying the particular vehicle to be fueled, means for determining the type and quantity of fuel to be dispensed, and numerical control means for directing the actual operations to be performed by the system. The numerical control means includes a stored program of guidance control information and an operative means responsive to the stored program and capable of actuating and controlling elements of the system as well as capable of accepting data for use by the stored program.

Fig. 1

INVENTORS
Irwin Ginsburgh
Lawrence T. Wright 3,536,109

CONTROL MECHANISM FOR AUTOMATIC DISPENSING OF MOTOR FUEL

CROSS REFERENCE TO RELATED APPLICATION

This application is a continuation-in-part of application Ser. No. 475,221, filed on July 27, 1965 and now abandoned.

BACKGROUND OF THE INVENTION

This invention relates to an automatically controlled fueling system for automotive vehicles. More particularly, it relates to the control mechanism which is part of a system for automatically dispensing motor fuels for automotive vehicles and which is employed to govern the sequence of operations which are used in the fueling of automotive vehicles.

The retailing of motor fuel for automobiles is a major business in the United States. At the present time, approximately 220,000 service stations are engaged in retailing gasoline, about 50 billion gallons of which are sold annually for the fueling of automobiles. Somewhere between 4 and 7 per gallon of the retail cost of gasoline is used to pay for the operations of the retail gasoline service station. This cost ordinarily varies within the specified range according to the geographical location, the prevailing economic conditions, and the policies of the supplying refiner. This cost could be substantially reduced if the fueling of automobiles were automatically performed. Although the trend in industry in the United States has been to mechanize and automate those operations which involve a high percentage of labor, the manner of the retail dispensing of gasoline has changed little in the last four decades.

A system for automatically fueling automotive vehicles has been disclosed by Irwin Ginsburgh in an application for U.S. letters Pat. Ser. No. 410,913, filed Nov. 13, 1964, and now abandoned in favor of U.S. application Ser. No. 656,171, filed July 26, 1967 now U.S. Pat. No. 3,527,268. These applications disclose an automatically controlled fuel system for automotive vehicles, including: dispensing means, including a dispensing head for transferring fuel from bulk storage to a fuel tank in such vehicles; means for locating a vehicle to be fueled in reference to the dispensing means or some predeterminable neutral control point; means for guiding the dispensing head to an inlet in the vehicle's fuel tank; means for engaging a discharge nozzle in the dispensing head with the fuel inlet; means for controllably flowing fuel through the nozzle into the tank; means for disengaging the dispensing head from the fuel inlet; numerical control means inclusive of a stored program of guidance control information based on the location of fuel tank inlets in such automotive vehicles relative to any predetermined control point of the fueling system and means associated with the stored program for selectively actuating and automatically controlling the guidance and operational movements of the dispensing head as well as the nozzle and other control elements associated with the dispensing head and with the fuel control; and means for selectively initiating the operation of the numerical control means and the flow of fuel through the dispensing system. Advantageously, the last-stated means comprises identification-selector means which are adapted to transmit a signal identifying the vehicle to be fueled with respect to year, manufacturer, model and body style, and to provide means for selecting the quantity and grade of fuel to be dispensed by the system.

SUMMARY OF THE INVENTION

We have devised a control mechanism for use in a system for automatically fueling an automotive vehicle. Such a control mechanism must identify the vehicle that is to be fueled, find that area on the vehicle where the fuel is to be introduced into the fuel tank of that vehicle, select the type and amount of fuel to be used, and provide for the payment of the fuel to be purchased. Our invention achieves these functions.

Broadly speaking, our invention is a control mechanism that can be used in a system for automatically fueling an automotive vehicle, such as the system disclosed in the above-mentioned patent applications Ser. No. 410,913 and Ser. No. 656,171. Our control mechanism comprises means for identifying the vehicle that is to be fueled, means for determining the type and the amount of fuel desired, and numerical control means which comprises a stored program of guidance-control information indicating the position of the fuel tank inlet in the vehicle, and operative means associated with the stored program and responsive thereto for selectively actuating and automatically controlling the guidance and operational movements of a fuel-dispensing head. The stored program and the operative means associated with this program direct the following operations in sequence: to locate the fuel tank inlet, to move the fuel-dispensing head to the fuel tank inlet, to insert the nozzle associated with the fuel-dispensing head into the inlet, to dispense the fuel, to withdraw the nozzle, and to return the fuel-dispensing head to its original position. The numerical control means may be further programmed to control a number of additional operations, including: opening any associated fuel tank inlet cover flap, holding the associated fuel cover flap in an open position, opening the fuel tank inlet, determining whether the nozzle has been in fact inserted into the inlet and indicating whether this has been accomplished, terminating the flow of fuel when the desired amount has been dispensed or when the fuel tank is full, closing the fuel tank inlet, and closing any associated fuel tank inlet cover flap. It is understood that the fuel tank inlet cover flap includes any covering over the fuel tank inlet designed to protect, decorate, or hide the fuel tank inlet. The means for identifying the vehicle is operationally connected to the operative means. The means for determining the type and the amount of fuel to be dispensed is, likewise, operationally connected to the numerical control means. Advantageously, the operational means of connection may include electrical, mechanical, pneumatic, hydraulic, etc. types of connections.

Our control mechanism first identifies the type of vehicle that is to be fueled. This identification is accomplished through the use of a means for identifying the vehicle. Such means could define each model of automotive vehicle by means of four criteria. These criteria are model year, manufacturer, model, and body style. The means for identifying the vehicle must be associated with a means for positioning the dispensing head and is desirable in a fully automatic system in view of the diversity of fuel tank inlet locations on automobiles. The identification of the vehicle may be fully automatic. One fully automatic means of identifying the vehicle would include a photoelectric technique designed to detect the silhouette of the vehicle to be fueled. Use of two silhouette views is preferable since greater accuracy can thereby be obtained.

Various other methods of automatically determining the identification of the vehicle are possible. The identification information could be included on the vehicle itself or on a card, plate, panel or other device attached to a predetermined and fixed location on all vehicles. Since it is necessary for the vehicle to be positioned relative to the automatic dispensing unit, the identification information can be located in a fixed position relative to the vehicle-positioning guide. It is much more convenient to place the identification information in a fixed relative position rather than to attempt to have all vehicle manufacturers place the fuel tank inlet in a fixed relative location. The vehicle would be provided with an identifier or identification area containing the identification information and in communication with a sensor so as to permit the identification information to be transmitted from the identifier to the sensor and from the sensor to the operative means. It may be necessary to have the vehicle identifier and the sensor positioned to come into close proximity or even contact with one another in order to effect the transmission of information. The identification information may be stamped into said identification area or, alternatively, may be magnetically recorded or painted thereon by means of paint which reflects light at a frequency causing a response in the sensor. Thus, once the vehicle is driven or moved into the proper location relative to the dispensing unit, the identification information would be readily available to the control mechanism of the automatic dispenser. The identification information could also be automatically transmitted to the control device by means of radio signals or light signals emanating from some part of the vehicle. Radio signals may be sent from a transmitter and an associated antenna mounted on the vehicle and different signals may be sent for each model year, manufacturer, model of vehicle and body style. In this case, the sensor would be a radio receiver adapted to receive the signals, decode them and send the identification information to the operative means for further transmission to the stored program. It is also possible that the identification means would be encoded on the vehicle itself through the use of a radioactive material. The sensor would be a radiation detector responsive to the radiation emitted from the radioactive material. The identification information could be encoded by means of the radiation pattern, the energy of the radioactive particles emitted, or the amount of radiation intensity.

Means for identifying the vehicle, which are designed to be actuated by the participation of a human element, as for example, the customer himself, are also desirable. The advantage of such a system over those described above is that the latter is much simpler and less subject to malfunction. One such customer participation identification means involves the use of an identification card appropriately notched, encoded, or embossed in a manner identifying the automobile by the four primary criteria referred to above. Advantageously, such identification card can also serve as the customer's charge account card to provide for automatic billing service. Using such a card, the customer inserts the card into a card reader, which comprises an element of the identification means, and the identification of the automobile is in this manner communicated to the apparatus. Use of an appropriately notched, encoded, or embossed credit card as part of the identification means may also be associated with the hereinafter-described means for paying for the fuel to be used, such latter means being adapted to record a noncash sale. Because the horizontal distance between the rear axle of American automobiles and the position of the driver varies relatively slightly, any card reader used as part of the identification means may be so positioned on a console to enable the driver to reach it without getting out of the automobile. As stated previously, in a more automatic variation of the identification card alternative, such a card may be affixed to the automobile, for example, to the left side of the windshield or to the left front window, and read photoelectrically or mechanically by the identification means.

Although this card could be used as the customer's charge account card, it could also contain information concerning the existence of a cover flap over the fuel tank inlet, the location of the flap, if any, and the fuel tank, in what direction the flap opens, and what is the angle of the fuel pipe. In addition, it might present a complete program for the dispenser. This program might be read into the control means and become the stored program of instructions for servicing this particular vehicle. Such a program might be printed on the card with some microprinting technique, or stored thereon in magnetic bits, as is common in the computer industry. The card could be carried by the driver or it might be permanently attached to the car. If it is portable, it could be stored in the glove compartment, or possibly clipped over the sun visor.

The use of identification cards as the sole means for identifying the automotive vehicle has certain limitations, inasmuch as not all potential customers might have such a card. However, if a fully automatic system were generally accepted and agreed upon by the manufacturer, an identification card permanently affixed to the vehicle might be produced when the vehicle is manufactured.

A more general means for identifying the vehicle has been designed whereby the customer manually signals to the apparatus the identification of his automobile by operating one or more actuators. These actuators may take any form, such as pushbuttons, toggle switches, or dials. In one embodiment, a console positioned adjacent to the driver's seat is provided with buttons for each combination of automobile model year, manufacturer, model and body style designation, and the driver merely pushes the buttons which identify his automobile. Inasmuch as there are about 100 such combinations per model year, thereby requiring about 1,000 buttons to accommodate automobiles manufactured within the past 10 years, some simplification of the console is desirable.

A preferred identification means comprises a console, which might be elevated and rotatable for ease of use, bearing appropriate actuators whereby some person, preferably the driver, identifies the automobile by operating in sequence the actuators indicating the model year, manufacturer, model and body style description. For example, a complete description might be 1963, Chevrolet, Impala four-door sedan. The order of the sequence is not critical and the console may be designed for other sequences. The rotatable character of the console permits it to carry all of the necessary actuators and still permits the driver to reach all of the actuators without leaving his seat. This is particularly advantageous when the same console is used to service both sides of a refueling island. A console of such a nature might be cylindrical or take other geometrical shapes such as a hexagon. Of course, instead of being rotatable, the console could be composed of two sets or series of panels which would be located back to back. Each would serve one side of a refueling island.

At some point, a customer must inform the apparatus of the amount and grade of fuel (if more than one grade of fuel is dispensed) or blend of fuel which is desired. The apparatus associated with receiving and implementing such information is called the means for determining the type and amount of fuel desired or, in other words, the fuel determination means. The amount of fuel desired may be designated by a definite volume, or by a command to continue filling the tank until it is full. Alternatively, the apparatus may be instructed to supply a certain dollar value of a certain grade of fuel. For example, a customer may ask for $2.50 worth of premium and this would specify a certain volume of fuel, providing that the unit price per gallon of fuel is known. A volume specification for the means of determining the type and the amount of fuel is appropriate when the customer is using a charge account card, but is somewhat less desirable with a cash customer because of the problem of arranging for payment. Selection of the grade of fuel is appropriately done by the operation of the appropriate actuator, pushbutton, toggle switch, or dial. The console referred to above may be used to carry the necessary actuators, buttons, switches, or dials to be actuated as part of the fuel determination means. In the event an incorrect actuator is operated during the sequence of identifying the car and selecting the fuel, the error may be corrected by providing a reject, or "clear" control which permits the error to be corrected.

The means for determining the amount and the type of fuel must include a means for paying for the fuel to be used. Such an apparatus, on the one hand, could be a means for the insertion of money, whereby the customer inserts the amount of money, bills or coins, or combination thereof, and the apparatus pumps an appropriate amount of fuel according to the amount inserted. On the other hand, the apparatus could be a means for the insertion of a credit card, whereby an appropriately encoded card is inserted, validated and the price of the dispensed fuel appropriately registered in the name of the purchaser. In this case, it would be necessary for the customer to operate appropriate actuators to determine the amount of fuel to be dispensed. The customer may simply cause the fuel tank to be completely filled. Preferably, both cash and credit means for paying for the fuel would be available.

When a credit card is used as the means by which payment is made for the fuel, various automatic billing systems may be adapted to work in conjunction with the control device. Conventional credit card systems provide for the service station attendant to manually imprint a sales transaction record with the customer credit card information and then manually record the details of the transaction on the record. The customer is given a copy of the sales record and the service station attendant retains the original to be later sent to a central billing office. The process could be made fully automatic through the control device. Once the credit card is inserted into the reader, a sales record is automatically created. Upon completion of the transaction, the data (grade, quantity, and price) would be automatically recorded on the sales record and a customer copy offered to the purchaser. The customer copy is prepared in printed form but the control system would also prepare a sales record directly in machine-readable form. Each sales record could be prepared either on a standard data processing card or, alternatively, it might be recorded on a reel of punched tape or magnetic tape. In any event, it would be necessary for the data processing cards or reels of tape to be periodically collected from the stations and sent to a centralized billing office for further processing.

Alternatively, the sales transaction information could be sent from the automatic dispensing system directly to the centralized billing office by means of a real-time transmission system. This system would involve the use of telephone lines and automatic dialing systems, or perhaps radio-microwave techniques. In this manner, the sales data could be almost instantaneously entered into a central data bank, thus eliminating the intermediate human processing steps. The advantages and potential economies of such a fully automated system are obvious and need not be discussed further. Advantageously, the automatic billing system is combined with a system of using a single digital computer as the program storage device holding a complete set of instructions for controlling the functions of a plurality of automatic dispensing units. This system is more fully described below.

As an optional feature, a start control may be provided as the last actuation step to be performed. Requiring this step to be performed prior to dispensing the fuel is not, however, necessary for operability, inasmuch as the apparatus may be designed to continue automatically through completion of the refueling operation once sufficient information is available for identification of the car, actuation of the arrangement for payment, and determination of the quantity of fuel desired (or in the alternative, filling of the fuel tank).

For the sake of safety and perhaps for human psychological satisfaction, it is desirable to provide an emergency stop control in order to stop the refueling operation upon command. In addition, there should be provided a means for automatically terminating the functioning of the apparatus if an apparatus failure occurs during the refueling operation. Such a failure might occur, for example, if the dispensing nozzle is not properly inserted into the fuel tank inlet of the vehicle. The terminating means would advantageously prevent fuel from being dispensed over the vehicle and the surrounding environment, rather than into the fuel tank. It is also desirable, and often required by law, that the customer be able to observe the amount, value and type (premium, regular or blend) of fuel being dispensed. Therefore, the dispenser should be provided with meters or other types of indicators so as to permit the customer to determine exactly how much fuel and the type of fuel that is being pumped into his vehicle. Adaptation of the typical gasoline pumps now in use may be used to permit the customer to so observe.

Before proceeding to characterize the movements of the apparatus necessary for the refueling operation and subsequent to the input of information identifying the vehicle model and the amount and type of fuel desired, it is desirable to describe broadly how such movements are controlled. More than a single set of such movements is necessary in view of the many models of automobiles which would be serviced commercially, inasmuch as there are about 100 models of automobiles manufactured in the United States each model year and their road life can be as long as 14 years. Thus, the apparatus is advantageously designed to handle at least 1,000 different automobile models and may readily be designed to handle an even greater number. In the absence of intentional design uniformity by an automobile manufacturer, the fuel tank inlet configuration and location relative to standard reference points will only coincidentally be the same for any two cars, although this often occurs, for instance, in a 1964 Chevrolet Impala two-door sedan and a 1964 Chevrolet Bel Air four-door sedan. Thus, each car requires its own set of instructions. Our apparatus uses a numerical control system in executing the various diverse movements necessary for automatically refueling many makes of automobiles. Numerical control denotes a method of controlling a machine automatically, in which a complete set of instructions is given to the machine and whereby all of its movements follow such instructions in the execution of its intended operation. Such a set of instructions is often called a stored program. Numerical control systems have been known heretofore and are finding increasing use where the same assembly of mechanical and electrical elements is to be used to execute either a diversity of operations or to act repetitively upon objects which vary significantly in configuration or position, such as automatic machine tools. A characteristic of numerical control systems is their capability to make, or cause to be made, measurements, directly or indirectly, of the distances, either angular or linear, or both, through which the mechanical elements of the machine have transversed, and to compare such measurements against instructions in the stored program in order to assure proper execution of the intended operation.

Programs may be stored on rotary cylindrical controllers (which comprise a rotating drum from which protrude small pins which act somewhat like cams on electrical or mechanical actuating means, rather like the early music boxes), on punch cards, and on either punched or magnetic tape. Various other program storage means are well known to those familiar with storage devices in the digital computer art. Other examples of devices in which the program may be stored are in magnetic core storage, thin film memory, magnetic drum, magnetic disk, and delay lines. It is also desirable to store the program in a separate digital computer which services the automatic dispensing unit by transmission of control information to it. This would advantageously involve a real-time system with the computer capable of performing a variety of tasks in addition to transmitting the control information to the automatic dispenser, as needed. The digital computer could be located at great distances from the dispensing unit and transmit the control information by means of radio or microwave signals, over telephone lines, or by means of light signals, as for example, laser beams. It is relatively easy to program a single digital computer to provide control information to operate more than one automatic dispensing unit, the various dispensing units situated either at a single geographic location or at different geographic locations. The use of multiplex equipment, real-time hardware, and telephone equipment, including automatic dialing systems, makes it possible for a single computer to provide control information for several hundred, or more, of the automatic dispensing units, and these dispensing units could be in, more or less, simultaneous operation.

Rotary mechanical controllers are somewhat cumbersome for use in storing the type of instructions needed by the automatic dispensers. Punched cards require more cumbersome sorting means than is desired relative to either punched or magnetic tapes, although all the necessary instructions required for a single model of automobile can be punched into a standard data processing card. Currently, we prefer to use tape for storage of the programs but this will change as other devices are improved. Economic reasons dictate the use of punched tape. However, magnetic tape offers a significant reduction in tape searching time. Storage on high speed magnetic drums or upon magnetic disks offer even faster searching time and the instructions for use with any particular model vehicle may be found in a matter of milliseconds.

A punched tape suitable for use in this operation is about 2 inches wide and bears 16 longitudinal channels per line, with 10 transverse lines per linear inch. Each channel on each line has room for punching therein a hole, and the presence or absence of such hole in each channel in a long line comprises one piece of stored data which, in combination with other such data, comprises an instruction. The presence or absence of the holes is determined by a reading head utilizing mechanical, pneumatic, or photoelectric principles. Photoelectric reading heads are desirable because they minimize tape wear while permitting maximum tape speeds. Magnetic tapes are, of course, read magnetically. By appropriate combinations of electrical, electronic, mechanical, hydraulic, and pneumatic means, each instruction is executed and, often, the completion of the execution of such instruction confirmed. Capability may be provided for the concurrent execution of a plurality of instructions. The amount of information necessary for each instruction or tape position identification determines the number of channels necessary on the tape, subject, however, to the fact that equipment is now available for reading a single instruction from a plurality of consecutive lines on a tape; and speaking broadly, two consecutive lines on an eight-channel tape are equivalent to a single line on a 16-channel tape.

The program for the numerical control system could be based upon an inching motor technique where voltage is applied to a motor and that motor will move its mechanical element or device a fixed distance and then stop. This fixed distance may be equivalent to one-eighth inch, or perhaps a quarter inch. The element or device which is operated by the motor can be moved a required distance by inching the associated motor enough times to move the element or device the selected distance, and in the desired direction. In a very elementary form, the program would be contained on a punched plastic tape having a number of holes on it. Each hole would move the stepping motor a fixed distance and the program would consist of sets of holes, each set which would move the element or device the desired distance. There would be an individual program for each car model and each of the motors in the system would be associated with a separate program channel. One roll of the punched plastic tape would be adequate to contain the programs for all the car models of one year. In such a case, approximately 10 rolls of tape would be needed to accommodate nearly all of the cars on the record. All these rolls would be stored together in a single pack with a tape reader.

DESCRIPTION OF A PREFERRED EMBODIMENT

Figure 1:
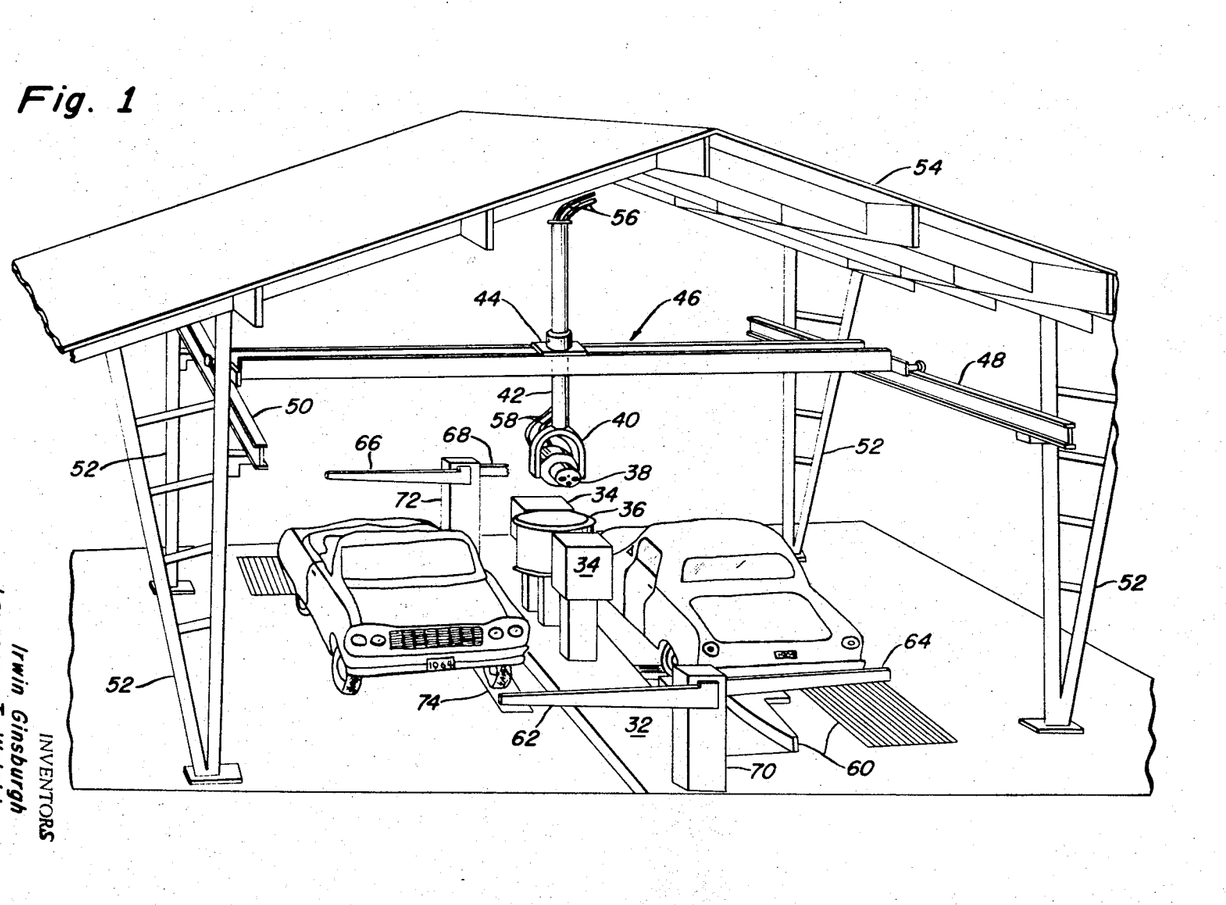
FIG. 1 is an isometric schematic overall view of a refueling station equipped with the dispensing equipment which would be regulated and controlled by the control mechanism described herein.

With reference to FIG. 1, two automobiles are shown in position for refueling on each side of an island 32 (as that term is used in the gasoline retailing business) upon which is disposed two typical gasoline pump stands 34. In between the pumps is a console 36 which bears a number of buttons or switches, as hereinafter described, through which the driver of the automobile exchanges with the apparatus information regarding the identification of the automobile in terms of its model year, manufacturer, model and body style, and the type and amount of fuel desired.

Above console 36 is dispensing head 38 suspended in yoke 40 from vertical elevator 42. Elevator 42 is carried by, and extends above carriage 44 which is supported by and traverses along bridge 46, which in turn is supported by and traverses along crane rails 48 and 50. Posts 52 support the crane rails and also support optional roof 54. Two fuel hoses 56 are shown entering the top of elevator 42 and lead into the elevator from fuel-pumping means not shown, which draws fuel from a fuel storage tank, also not shown. Flexible hoses 58 lead from the the base of elevator 42 into the rear end of dispensing head 38.

Dispensing head 38 carries flap-opening means, gas cap removal means and nozzle projection means, which are merely schematically illustrated in FIG. 1 by the small circles on the face of dispensing head 38. Many of the items shown in FIG. 1 are described in more specific detail in Pat. application, Ser. No. 410,913. When dispensing head 38 is centered above island 32 as shown in FIG. 1, it is in its neutral position with respect to each automobile.

Lateral and longitudinal vehicle positioning means 60 are constructed into the grade surface of the refueling station. A pressure sensing plate 74 detects that the automobile has advanced until the left front wheel rests on the plate.

Barrier gates 62, 64, 66 and 68 are mounted on barrier posts 70 and 72, respectively, at each end of island 32, and function to direct automobiles to the proper side of island 32. Gates 64 and 66 normally are open when no automobiles are being serviced, but the appropriate one closes after an automobile drives in to be serviced. Gates 64 and 66 keep the automobile next in line for service from moving in close so that there is sufficient clearance for dispensing head 38 to operate properly. Gates 62 and 68 are raised when the servicing operation is complete.

Figure 2:
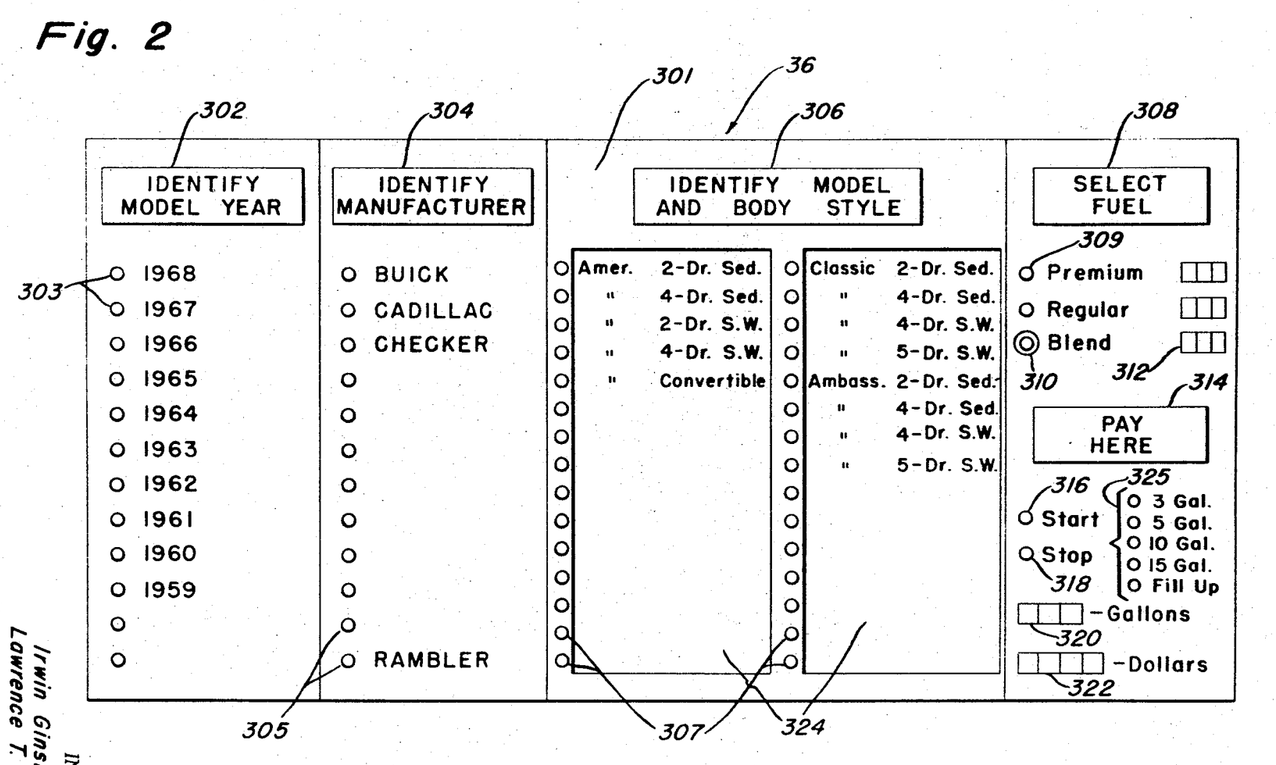
FIG. 2 illustrates a panoramic view of the face of the control console.

After the automobile has been positioned, the left front window is opposite the console, convenient for the driver to exchange with the apparatus information relative to the description of the automobile and amount of fuel desired. Of course, a person other than the driver could supply at least part of this information. FIG. 2 illustrates a panoramic view of the face 301 of console 36. The console face is provided with a model year identification panel area 302 having a column of 10 or more pushbuttons 303 opposite which appear the numbers of the various automobile model years. Of course, it is understood that any place in this description where the words "pushbutton" or "button" are used, any other type of actuator, as for example, switch, control or dial, could be substituted and would be equally appropriate. The words "Identify Model Year" appear above this panel area. Adjacent to such panel area is a manufacturer identification panel area 304 having a column of pushbuttons 305 opposite which appear the names of the automobile manufacturers, e.g., Buick, Cadillac, Checker, etc. The remaining manufacturers' names have been omitted from FIG. 3 for the sake of convenience. The words "Identify Manufacturer" appear at the top of this panel area.

Moving to the right, FIG. 2 shows a model and body style selection panel area 306 which comprises two columns of pushbuttons 307 with which is associated the characterization of each model and body style of automobile of a given manufacturer which the apparatus is designed to refuel. The designations of such models and body styles will appear on a chart reel, rather like a scroll, underneath transparent windows 324 on panel area 306. The chart reel will have a block of model and body style designations for each manufacturer for each year. About 32 push buttons are necessary to characterize all the model designations for any 1-year period for the manufacturer currently having the greatest number of models. FIG. 2 shows the model designations for 1962 Ramblers. A plurality of model designations may be identified by one pushbutton where each of such models has its fuel tank inlet in the same position, relative to reference planes, which are discussed in the above-mentioned Pat. application, Ser. No. 410,913, and, hence, the same set of instructions in the stored program will properly refuel each such model.

It is conceivable that panel area 306 could be divided into two panels, wherein one panel would contain pushbuttons related to the model of the vehicle and the other panel would contain pushbuttons related to the body style of the vehicle. In such case, appropriate designations could still appear on a chart reel for such subpanel.

Further to the right of the console panel, there is a fuel selection panel area 308 bearing pushbuttons 309 for the designation of either premium or regular grade gasoline, or a selector 310 for the selection of an intermediate blend of fuels. Opposite the fuel quality designations are windows 312 for displaying the price per gallon of the grades of fuel. In the center of the lower portion of the console, a means for paying for the fuel 314 for the insertion of money, bills and/or coins, or a credit card, is schematically shown whereby the customer arranges to pay for the fuel. Beneath means for paying 314 is a start control 316 and an emergency stop control 318. In addition, pushbuttons 325 are used to inform the control mechanism as to the amount of fuel desired. For the sake of convenience, only a few of the pushbuttons 325 are depicted.

At the extreme lower right of the console is a porthole 320, behind which may be placed a counter which visibly shows the amount of fuel which has been pumped during any individual sale, and a porthole 322, behind which may be placed a counter showing the dollar value of the amount of fuel which has been pumped as shown through porthole 320.

As explained previously, the portion of the console bearing the model year, manufacturer, model and body style identification panels is rotatable in order that a driver of an automobile may operate all the necessary pushbuttons without leaving the driver's seat. The console may be rotated automatically as each bit of information is imparted by the driver, mechanically upon signal from the driver, or manually.

In operation, when an automobile is first positioned for refueling, the driver is presented with the model year and manufacturer identification panels 302 and 304 directly opposite the automobile window. The driver pushes the appropriate buttons on panels 302 and 304. The console then rotates to present model identification panel 306 to the driver. The driver then pushes the appropriate pushbutton 307 identifying the model, and thereafter, in sequence, selects the grade of fuel, inserts money or a credit card into payment means 314, and actuates start control 316.

The sequence of operations which the automobile driver is to perform may be visually indicated to him by successively illuminating the panels or the legends on such panels, e.g., illuminating in succession the model year identification panel 302, manufacturer identification panel 304, model and body style panel 306, fuel grade panel 308, payment means mechanism 314, and start button 316.

On the other hand, the sequence of operations might be directed through a series of sequentially operated instruction lights which inform the customer which button, or buttons, to press. Such instruction lights would be incorporated into the control console. At the very top would be located a sign which says "Please Wait". This sign would be lit in the case when the other side of the refueling island is occupied by a car, which is using a dispenser. However, if the other side of the refueling island is unoccupied, this instruction light would not be lit. If it would not be lit, another signal light, the No. 1 signal light, would be on. This signal light would inform the customer that he is to actuate the button corresponding to the particular year of his car. When he has so actuated this button, the No. 1 light would go out and a No. 2 light would become lit. This No. 2 instruction light would say, for example, "Press Button for Car Manufacturer". The customer would then press the button corresponding to the name of the manufacturer of his car. When he has done this, the No. 2 light would go out and the No. 3 light would become lit. This No. 3 instruction light would say, for example, "Press Button for Model and Body Style of Car". Again he would actuate the button which corresponds to the model and body style of his car. There would be two rows of these buttons and when he had actuated the proper button, the No. 3 light would go out and a No. 4 light would become lit. This No. 4 instruction signal reads "Select Fuel". He would press the buttons corresponding to the type of fuel he desires, after which the No. 4 instruction light would go out and a No. 5 instruction light would become lit. This No. 5 instruction light would relate to information for the financial transaction, gallonage and money payment. After payment had been established either by coin or credit card, the No. 5 instruction light would go out and if all the preceding buttons have been pressed properly, a No. 6 instruction sign would become lit. This No. 6 instruction sign would say, for example, "Press the Start Button".

On the panel of the console there could be at least one more button. This button would be labeled the "Emergency" button or stop control. This latter button could be pressed at any time to stop the sequence, or if the customer would change his mind before the automatic dispenser had started, to return the customer's money.

It is to be understood that the sequence of information exchanged between the driver and the console is a matter of design selection and is not critical; the first step in the sequence could be, for instance, the selection of the grade of fuel or the actuation of the means for paying. Also, the provision on the console (or anywhere else) of a start control and an emergency stop control actuatable by the driver is optional. So also is the provision for displaying on the panel the amount and value of the fuel pumped. The arrangement shown in FIG. 2 of the console panel is illustrative, and many modifications of it are possible.

The pushbuttons 303 by which the model year of the vehicle is determined, are connected to the stored program tape system. Operating one of the buttons 303 starts the tape reading head hunting for that portion of the tape or tapes bearing the stored program instructions for automobiles of that particular model year. Pushing button 303 also actuates a chart reel driving means behind panel 306 so that the appropriate chart sections for the year selected are advanced approximately into position for viewing. The pushbuttons 305 identifying the manufacturer are likewise connected to the stored program tape system and to the chart reel driving means and may also be connected to a console rotation driving means. Pushing one such button concurrently starts the tape reading head searching for that portion of the tape which bears instructions for all such manufacturers' models in such particular year, further starts the chart reel driving means behind panel 306 unrolling the chart reel to present the driver the proper portion of the model and body style identification chart for such manufacturer for the particular model year previously selected and further may cause the console rotation driving means to rotate the console to present the model and body style identification panel opposite and within easy reach of the driver. If the sequence of operations is visually indicated by successive illumination of the panels, the pushing of a pushbutton in one panel causes the illumination of the console face in which lie the pushbuttons to be pushed next.

After the necessary information has been supplied, dispensing head 38 is moved from its neutral position to a point adjacent to the fuel tank inlet. This movement is effected by the combined operation of the elevator, bridge, and carriage.

Figure 3:
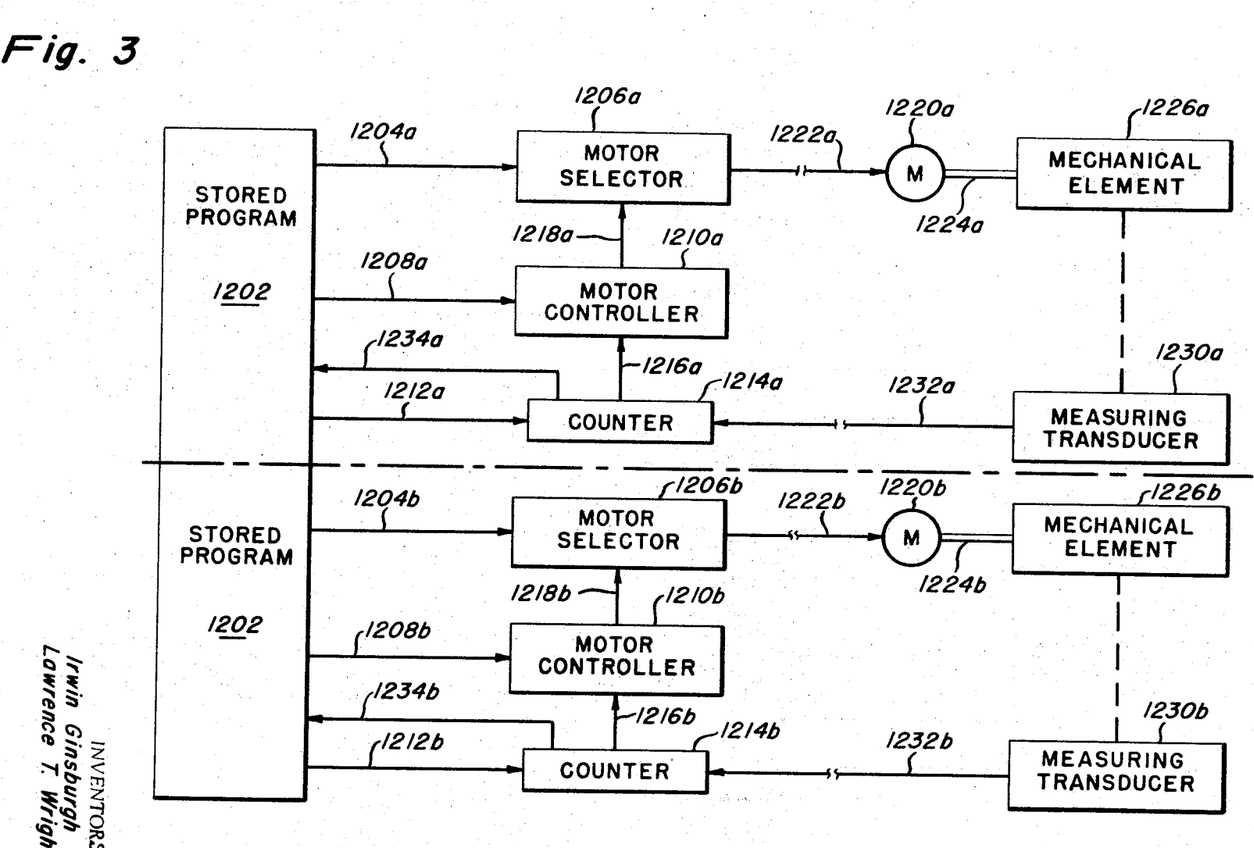
FIG. 3 symbolically illustrates the logic circuitry of the numerical control system utilized in operating the automatic fuel dispensing system.

Although the technique of using systems of stored programs and numerical control to operate machinery is known, it is believed appropriate to outline broadly and in conjunction with a schematic diagram the logic (as that word is used in the relevant art) of a numerical control system which may be used in operating an automatic refueling system, such as the system described in Pat. application Ser. No. 410,913. FIG. 3 symbolically illustrates the principal elements and circuitry of such logic. Although, for the purpose of clarity, the following description specifies certain types of connections or linkages, it is understood that this disclosure is not to be limited thereby. The various elements in a particular embodiment may be connected or linked in a wide variety of ways including electrically, mechanically, pneumatically, hydraulically, magnetically, etc. Two parallel arrangements are shown, one on each side of the horizontal dashed line, which provides the capability of concurrently operating two numerically controlled mechanical elements. For convenience and brevity of description, each parallel box and line on FIG. 3 will bear the same numeral, but be differentiated by letter suffixes. The use of two such arrangements is optional; one suffices for operability, and more than two merely provide for the concurrent operation of an additional mechanical element for each additional parallel arrangement.

Stored program 1202 is electrically connected through line 1204a to motor selector 1206a; through line 1208a to motor controller 1210a; and through line 1212a to counter 1214a. Counter 1214a is connected through line 1216a to motor controller 1210a, which in turn is connected through line 1218a to motor selector 1206a. (The arrows on the electrical lines indicate the direction that the signal is being transmitted.)

Motor selector 1206a is connected to the desired motor 1220a through line 1222a the latter being shown broken, because the same motor selector will be connected sequentially through an appropriate switch (not shown) to various motors. Motor 1220a is mechanically linked through linkage 1224a (illustratively, a rack and pinion, worm gear, chain and sprocket, spline, etc.) to the mechanical element 1226a (illustratively, the bridge, carriage, elevator, outer nozzle projection arm, etc.) driven by such motor.

The distance, linear or angular, through which mechanical element 1226a is moved is measured electromagnetically (as illustrated by the dashed line) by measuring transducer 1230a, which transmits its signal through line 1232a to counter 1214a. The counter in turn signals back to the stored program through line 1234a that the act instructed by the stored program has been executed, and that the logic system is ready for the next instruction.

The signal transmitted by the stored program over line 1204a determines the motor to be actuated; the signal transmitted over line 1208a determines the direction of rotation (clockwise or counterclockwise) of such motor; and the signal transmitted over line 1212a determines the angular distance such motor is to be rotated, which, of course, determines the distance, angular or linear, that its driven mechanical element 1226a is to move. The information signalled into motor controller 1210a is transmitted through line 1218a and motor selector 1206a to motor 1220a.

The signals transmitted by counter 1214a over line 1216a not only start and stop motor 1220a, but also slow it down, in response to the signal from measuring transducer 1230a transmitted over line 1232a indicating, when compared to the total desired distance signal received from the stored program over line 1212a, that the desired movement of mechanical element 1226a is almost complete. This avoids undesirable overrun. Accordingly, counter 1214a desirably has preset capability and also warning capability.

Suitable counters, motor controllers, and motor selectors may be electromechanical subassemblies which currently are commercially available.

Inasmuch as a plurality of clutches, all transmitting power from one motor, may be used to reduce the number of motors required, the logic system depicted by FIG. 3 may be expanded by interposing a clutch, as part of mechanical linkage 1224, between motor 1220 and mechanical element 1226, such clutch to be designated by a clutch selector (not shown).

An illustration of an instance of the use of parallel logical circuits capable of simultaneously operating two mechanical elements are the concurrent traversing of bridge 46 along crane rails 48 and 50, and of carriage 44 along the bridge 46. However, the capability for plural concurrent operation is not essential for operability since operational requirements may be satisfied (at the cost of additional time of operation and a lengthier stored program) by sequential operation in small alternate increments.

From the above-described embodiments, it is evident to those skilled in the art that variations and modifications of our invention can be derived from the foregoing disclosure. Such variations and modifications are considered to be within the spirit and the scope of the present invention; consequently, the scope is not to be limited by the FIGS. and embodiments presented herein.

We claim:

1. A control mechanism for use in a system for automatically fueling an automotive vehicle having a fuel tank inlet which comprises:
   a. means for identifying the vehicle to be fueled;
   b. means for determining the type and amount of the fuel desired; and
   c. numerical control means, which comprises a stored program of guidance control information indicating the position of the fuel tank inlet in said vehicle, means for storing said stored program and operative means associated with said program and responsive thereto for selectively actuating and automatically controlling the guidance and operational movements of a fuel dispensing head, said head having a nozzle, a flap opening-closing means and inlet opening-closing means associated therewith, said means for identifying the vehicle providing control information to said operative means, said means for determining the type and the amount of the fuel being connected to said numerical control means, said numerical control means and said operative means associated with said program directing the following operations in sequence:
      i. to locate the fuel tank inlet;
      ii. to move the fuel dispensing head to said inlet;
      iii. to insert the associated nozzle into said inlet;
      iv. to dispense the fuel;
      v. to withdraw said nozzle; and
      vi. to return said fuel dispensing head to its original position.

2. The control mechanism of claim 1 wherein said means for identifying the vehicle to be fueled comprises a plurality of actuators, whereof appropriate actuators are operated by a person to indicate to said control mechanism:
   a. the model year;
   b. the name of the manufacturer;
   c. the model; and
   d. the body style of said vehicle.

3. The control mechanism of claim 1 wherein said means for identifying the vehicle to be fueled comprises a plurality of panels, said panels being mounted on a console, and including a first panel which contains a first set of actuators, each actuator of said first set of actuators corresponding to and representing a particular model year of a vehicle, a second panel which contains a second set of actuators, each actuator of said second set of actuators corresponding to and representing a particular manufacturer of automotive vehicles, and a third panel which contains a third set of actuators, each actuator of said third set of actuators corresponding to and representing a particular model and body style of a vehicle, each of said panels having a legend associated therewith to indicate the function of the set of actuators located thereon, a designation as to what a particular actuator represents being located adjacent to said particular actuator, the designation for the actuators of said third set of actuators being mounted so that different designations may appear adjacent to the actuators of said third panel, said different designations being selected and controlled by the operation of the actuators of said first set of actuators and of said second set of actuators, all actuators being connected to switches, each actuator being associated with a different, separate switch, each of said switches being connected to said operative means, said actuators being actuated by a person for the purpose of identifying said vehicle, and said stored program providing the information concerning the position of the fuel tank inlet of the vehicle identified by said person through the operation of appropriately selected actuators.

4. The control mechanism of claim 1 wherein said means for identifying the vehicle to be fueled comprises an appropriate card reader into which a suitable identification card may be inserted, said card reader being connected to said operative means for the communication of identification information to said control mechanism.

5. The control mechanism of claim 1 wherein said means for identifying the vehicle to be fueled comprises a sensor and an identifier, said sensor being connected to said operative means and adapted to receive identification information from said identifier, which identifier is on said vehicle.

6. The control mechanism of claim 5 wherein said identifier comprises an identification area placed in the same relative position of all vehicles and wherein said sensor is positioned to mate with said identification area to transmit identification information from said identification area through said sensor to said operative means.

7. The control mechanism of claim 6 wherein said identification information is stamped into said identification area.

8. The control mechanism of claim 6 wherein said identification information is magnetically recorded on said identification area.

9. The control mechanism of claim 6 wherein said identification information is recorded on said identification area by means of paint, said paint reflecting light over essentially any frequency and said sensor responding to said frequency.

10. The control mechanism of claim 5 wherein said identifier comprises an antenna mounted on said vehicle and emitting a radio signal from said vehicle, a different signal being emitted for each model year, vehicle manufacturer, model of vehicle, and body style, and a radio receiver adapted to receive said radio signal and transmit said signal to said operative means.

11. The control mechanism of claim 5 wherein said identifier comprises identification information encoded on said vehicle with radioactive material, and said sensor is a radiation detector, sensitive to the radiation emitted from said radioactive material.

12. The control mechanism of claim 1 wherein said means for determining the type and the amount of fuel comprises a plurality of sets of actuators including a first set of actuators, a second set of actuators, a means for paying for the fuel to be dispensed, a means for indicating the amount of fuel dispensed, a means for indicating the price of the fuel dispensed, a selector, and a third set of actuators, each actuator of said first set of actuators corresponding to and representing a grade of fuel, each actuator of said second set of actuators corresponding to and representing a particular quantity of fuel, said selector being employed by a person for the selection of a blend of fuel, a first actuator of said third set of actuators corresponding to and representing a starter control, a second actuator of said third set of actuators corresponding to and representing a stop control, appropriate actuators and selectors being operated for the selection of the amount and the type of fuel, said starter control being actuated to start the fueling of said vehicle after the selection of the type and the amount of the fuel and payment have been completed, said stop control being operated where such stoppage is determined to be desirable and necessary, all actuators being connected to switches, each actuator being connected to a separate and different switch, and said switches, said means for paying for the fuel dispensed, said means for indicating the amount of fuel desired, said means for indicating the price of the fuel and said selector being connected to said operative means, said operative means being adapted to operate an associated fuel pump in delivering the correct amount of fuel selected by said person.

13. The control mechanism of claim 12 wherein each actuator of said second set of actuators corresponds to and represents a sum of money, the amount of fuel being dispensed depending upon the sum of money indicated by said actuators and by the predetermined unit price of said fuel.

14. The control mechanism of claim 1 wherein said numerical control means comprises:
 a. at least one motor selecting means, said motor selecting means being connected to said operative means for the transmission of signals from said stored program through said operative means to said motor selecting means;
 b. a plurality of motor means, each of said motor means being connected to one of said motor selecting means, said motor selecting means selecting the appropriate motor means as directed by said stored program so that the selected motor means can be activated;
 c. a plurality of mechanical elements each of said mechanical elements being connected to a different motor means and being driven by the connected motor means;
 d. a plurality of measuring transducer means, each of said measuring transducer means being associated with a different mechanical element;
 e. a counting means, said counting means being connected to said measuring transducer means for the transmission of signals from said measuring transducer means, said signal being transmitted from said measuring transducer means to said counting means indicating the extent of movement of the appropriate mechanical element, said counting means being connected to said operative means for the transmission of signals from said stored program through said operative means to said counting means to indicate the extent of movement prescribed for said appropriate mechanical element; and
 f. a motor controlling means, said motor controlling means being connected to said counting means for the transmission of signals from said counting means to said motor controlling means informing said motor controlling means how the selected motor means should be operated, said motor controlling means being connected to said operative means for the transmission of signals from said stored program through said operative means to said motor controlling means informing said motor controlling means as to the desired direction of rotation of said selected motor means, said motor controlling means being connected to said motor selecting means for the transmission of signals from said motor controlling means through said motor selecting means to said selected motor means in order to control said selected motor means as to speed and motion, and said counting means being connected to said operative means for the transmission of signals from said counting means through said operative means to said stored program informing said stored program that said mechanical element has completed the desired movement, thus enabling said stored program and said operative means to initiate the immediately subsequent operation.

15. The control mechanism of claim 1 wherein said numerical control means comprises:
 a. at least one motor selector, said motor selector being connected to said operative means for the transmission of signals from said stored program through said operative means to said motor selector;
 b. a plurality of motors, each of said motors being connected to said motor selector, said motor selector selecting the motor which is prescribed by said stored program to said motor selector so that the selected motor can be energized;
 c. a plurality of mechanical elements, each of said mechanical elements being connected to a different motor and being driven by the connected motor;
 d. a plurality of measuring transducers, each of said measuring transducers being associated with a different mechanical element;
 e. a counter, said counter being sequentially connected to each of said measuring transducers for the transmission of signals from said measuring transducers, said signals being transmitted from said measuring transducers to said counter indicating the extent of movement of the appropriate mechanical element, said counter being connected to said operative means for the transmission of signals from said stored program through said operative means to said counter to indicate the extent of movement prescribed for the appropriate mechanical element; and
 f. a motor controller, said motor controller being connected to said counter for the transmission of signals from said counter to said motor controller, informing said motor controller as to the starting, speed, and stopping of the appropriate motor, said motor controller being connected to said operative means for the transmission of signals from said stored program through said operative means to said motor controller informing said motor controller as to the desired direction of rotation of said appropriate motor, said motor controller being connected to said selector for the transmission of signals from said motor controller through said selector to said appropriate motor in order to control said appropriate motor as to speed and motion, said controller being connected to said operative means for the transmission of signals from said counter through said operative means to said stored program informing said stored program that said appropriate mechanical element has completed the desired movement, thus enabling said stored program to initiate the immediately subsequent operation.

16. The control mechanism of claim 1 wherein said stored program comprises instructions to provide guidance information to said operative means to direct the:
 a. locating of the fuel tank inlet;
 b. moving of fuel dispensing head to said inlet;
 c. opening of any associated flap;
 d. opening of said inlet;
 e. inserting of the associated nozzle into said inlet;
 f. detecting that said nozzle is, in fact, inserted in said inlet;
 g. dispensing of the fuel;
 h. stopping of the flow of fuel when the desired amount of fuel has been dispensed or the fuel tank has become full;
 i. withdrawing of said nozzle;
 j. closing of said inlet; and
 k. closing of any associated flap.

17. The control mechanism of claim 1 wherein said means for storing said program includes rotary mechanical controllers.

18. The control mechanism of claim 1 wherein said means for storing said program includes punched cards.

19. The control mechanism of claim 1 wherein said means for storing said program includes punched tape.

20. The control mechanism of claim 1 wherein said means for storing said program includes a magnetic tape.

21. The control mechanism of claim 1 wherein said means for storing said program includes a magnetic drum.

22. The control mechanism of claim 1 wherein said means for storing said program includes a magnetic disk.

23. The control mechanism of claim 1 wherein said means for storing said program includes the main storage unit of a digital computer.

24. The control mechanism of claim 23 wherein the digital computer main storage unit comprises core memory storage.

25. The control mechanism of claim 23 wherein the digital computer main storage unit comprises thin film memory.

26. The control mechanism of claim 23 wherein said digital computer is remote from said operative means, and said guidance control information stored in said computer is transmitted from said remote digital computer to said operative means.

27. The control mechanism of claim 3 wherein said third panel contains a fourth set of actuators and a fifth set of actuators, said fourth set of actuators corresponding to and representing the models of a vehicle and said fifth set of actuators corresponding to and representing the body styles of a vehicle, a designation for each actuator in said fourth set and said fifth set being located adjacent to said particular actuator, the designation for the actuators in said fourth set and said fifth set being mounted so that different designations may appear adjacent to the actuators of said fourth set and said fifth set, said different designations being selected and controlled by the operation of the actuators of said first panel and said second panel.

28. The control mechanism of claim 12 wherein said means for paying for the fuel comprises a money acceptor, said money acceptor being capable of searching, identifying and verifying the money inserted, and actuating a computing mechanism to count the money inserted and to determine whether any money is to be returned to said person, and returning the determined change to said person.

29. The control mechanism of claim 12 wherein said means for paying for the fuel is a means for the insertion of a credit card having encoded thereon at least a purchaser identification number whereby said credit cart is inserted and validated and the price of the dispensed fuel is appropriately registered in the name of the purchaser.

30. The control mechanism of claim 29 wherein said means for paying for the fuel comprises a money acceptor and means for the insertion of a credit card.

31. The control mechanism of claim 30 further including means for producing a sales transaction record, said means recording at least part of the following data:
 a. purchaser identification number;
 b. grade of fuel dispensed;
 c. quantity of fuel dispensed;
 d. unit price of fuel dispensed; and
 e. total transaction price.

32. The control mechanism of claim 31 wherein said means for producing a sales transaction record produces a sales receipt in printed form from said sales transaction record.

33. The control mechanism of claim 31 wherein at least part of said sales transaction record data is accumulated into total amounts over a determined period of time.

34. The control mechanism of claim 33 wherein said means for producing a sales transaction record records said transaction in code on paper tape by the punching of holes into said paper tape.

35. The control mechanism of claim 33 wherein said means for producing a sales transaction record records said transaction on magnetic tape by the magnetization of certain portions of said tape.

36. The control mechanism of claim 33 wherein said means for producing a sales transaction record records said transaction in code on data processing cards, by the punching of holes into said cards.

37. The control mechanism of claim 33 wherein said sales transaction record data is transmitted from said control mechanism to a remote location for further processing.

38. The control mechanism of claim 37 wherein said sales transaction record data is teleprocessed to a remote computer site for subsequent storage and processing.

39. A control mechanism including a stored program, means for storing said program and associated operative means for use in a system for automatically fueling an automotive vehicle which comprises:
 a. means for identifying the vehicle to be fueled, said means comprising an elevated rotatable console upon which is mounted a plurality of sets of actuators, the first of said set of actuators representing the model year of a vehicle, each of said actuators representing a particular model year; the second of said sets of actuators representing the manufacturer of an automotive vehicle, each of said actuators corresponding to a particular automotive vehicle manufacturer, the third of said sets of actuators representing the automotive model and body style, each of said actuators corresponding to a particular model and body style; each of said sets having a legend associated therewith to indicate the function of the set of actuators; a designation of what a particular actuator represents being located adjacent to said particular actuator, the designations of the actuators of said third set of actuators being mounted on a scroll-type means, said scroll-type means being capable of being advanced so that difference designations may appear opposite the actuators of said third set of actuators, said different designations being selected and controlled by the activated actuators of said first set of actuators and of said second set of actuators, all actuators being connected to switches, each actuator being associated with a different, separate switch, each of said switches being connected to said operative means, said actuators being activated by a person for the purpose of identifying said vehicle, and said stored program providing the information concerning the position of the fuel tank inlet of the vehicle identified by said person through the activation of appropriately selected actuators;

b. means for determining the type and the amount of the fuel desired, said means for determining the type and the amount of fuel comprising a fourth set of actuators and a fifth set of actuators, a means for paying for the fuel to be dispensed, a means for indicating the amount of fuel dispensed, a means for indicating the price of the fuel dispensed, an adjustable selector and a sixth set of actuators, each actuator of said fourth set of actuators corresponding to and representing a grade of fuel, each actuator of said fifth set of actuators corresponding to and representing a particular quantity of fuel, said adjustable selector corresponding to and being employed by said person for the selection of a blend of fuel, a first actuator of said sixth set of actuators corresponding to and representing a starter, a second actuator of said sixth set of actuators corresponding to and representing a stop control, appropriate actuators and selectors being operated by said person for the selection of the amount and the type of fuel, said starter being actuated by said person to start the fueling of said vehicle by said person after the selection of the type and the amount of the fuel and payment have been completed, said stop control being actuated by said person where such stoppage is determined to be desirable and necessary, said fourth set of actuators also being located upon said console, all actuators in said fourth set being connected to switches, each actuator being connected to a separate and different switch, and said switches, said means for paying for the fuel to be used, said means for indicating the amount of fuel, said means for indicating the price of the fuel, and said adjustable selector all being connected to said operative means, said stored program being adapted to supply information through said operative means for the operation of an associated fuel pump in delivering the correct amount of fuel selected by said person; and c. numerical control means, said numerical control means comprising the stored program of guidance control information, indicating the position of the fuel tank inlet in said vehicle, and the operative means associated with said stored program and responsive thereto for selectively actuating and automatically controlling the guidance and operative movements of a dispensing head having an associated flap opening-closing means, inlet opening-closing means and nozzle, said means for identifying the vehicle providing control information to said operative means, said means for determining the type and the amount of fuel being connected to said numerical control means, said operative means associated with said stored program comprising at least one selecting switch, said selecting switch being responsive to said stored program for the transmission of signals from said stored program to said selecting switch, a plurality of motors, each of said motors being connected to said selecting switch, said selecting switch selecting the motor which is prescribed by said stored program to said selecting switch so that the selected motor can be energized, a plurality of mechanical elements, each of said mechanical elements being connected to a different motor and being driven by the connected motor, a plurality of measuring transducers, each of said measuring transducers being associated with a different mechanical element, a counter, said counter being sequentially connected to each of said measuring transducers for the transmission of signals from said measuring tranducers, said signals being transmitted from said measuring transducers to said counter indicating the extent of movement of the appropriate mechanical element, said counter being connected to said operative means for the transmission of signals from said stored program through said operative means to said counter to indicate the extent of movement prescribed for the appropriate mechanical element; and motor controller, said motor controller being connected to said counter for the transmission of signals from said counter to said motor controller, informing said motor controller as to the starting, speed and stopping of the appropriate motor, said motor controller being connected to said operative means for the transmission of signals from said stored program through said operative means to said motor controller, informing said motor controller as to the desired direction of rotation of said appropriate motor, said motor controller being connected to said selecting switch for the transmission of signals from said motor controller through said selecting switch to said appropriate motor in order to control said appropriate motor as to speed and motion, said counter being connected to said operative means for the transmission of signals from said counter through said operative means to said stored program informing said stored program that said appropriate mechanical element has completed the desired movement, thus enabling said stored program to initiate the immediately subsequent operation, said numerical control means and said operative means associated with said stored program directing at least the following operations in sequence: to locate the fuel tank inlet, to move the fuel-dispensing head to said inlet, to insert the associated nozzle into said inlet, to dispense the fuel, and to withdraw said nozzle.

40. The control mechanism of claim 39 wherein said stored program comprises instructions to provide guidance information to said operative means to direct the:

a. locating of the fuel tank inlet;
b. moving of the fuel dispensing head to said inlet;
c. opening of any associated flap:
d. opening of said inlet;
e. inserting of the associated nozzle into said inlet;
f. detecting that said nozzle is, in fact, inserted in said inlet;
g. dispensing of the fuel;
h. stopping of the flow of fuel when a desired amount of fuel has been dispensed or the fuel tank has become full;
i. withdrawal of said nozzle;
j. closing of said inlet;
k. closing of any associated flaps; and
l. returning of said dispensing head to its original position.

41. A control mechanism for use in a system for automatically fueling an automotive vehicle having a tank with an inlet cap and a covering flap which comprises:

a. for identifying the vehicle to be fueled;
b. means for determining the type and amount of fuel desired; and
c. numerical control means, which comprises a stored program of guidance control information indicating the position of the fuel tank inlet in said vehicle and operative means associated with said program and responsive thereto for selectively actuating and automatically controlling the guidance and operational movements of a fuel-dispensing head, said head having a nozzle, a flap opening and closing means, and cap removing and replacing means associated therewith, said means for identifying the vehicle being electrically connected to said operative means, said means for determining the type and the amount of the fuel being electrically connected to said numerical control means, said numerical control means and said operative means associated with said program directing the following operations in sequence; to locate the fuel tank inlet, to move the fuel-dispensing head to said inlet, to insert the associated nozzle into said inlet, to dispense the fuel, to withdraw said nozzle, and to return said fuel-dispensing head to its original position.

42. The control mechanism of claim 41 wherein said means for identifying the vehicle to be fueled comprises a plurality of pushbuttons, whereof appropriate pushbuttons are actuated by the driver of said vehicle to indicate to said control mechanism the model year, the name of the manufacturer, the model, and the body style of said vehicle.

43. The control mechanism of claim 41 wherein said means for identifying the vehicle to be fueled comprises a plurality of panels, said panels being mounted on a console and including a first panel which contains a first set of pushbuttons, each pushbutton of said first set of pushbuttons corresponding to and representing a particular model year of a vehicle, a second panel which contains a second set of pushbuttons, each pushbutton of said second set of pushbuttons corresponding to and representing a particular manufacturer of automotive vehicles, and a third panel which contains a third set of pushbuttons, each pushbutton of said third set of pushbuttons corresponding to and representing a particular model and body style of a vehicle, each of said panels having a legend associated therewith to indicate the function of the set of pushbuttons located thereon, a designation of what a particular push button represents being located adjacent to said particular pushbutton; the designation for the pushbuttons of said third set of pushbuttons being mounted so that different designations may appear opposite the pushbuttons of said third panel, said different designations being selected and controlled by the actuated pushbuttons of said first set of pushbuttons and of said second set of pushbuttons, all pushbuttons being directly connected to electrical switches, each pushbutton being associated with a different, separate electrical switch, each of said electrical switches being electrically connected to said operative means, said pushbuttons being actuated by the driver of said vehicle for the purpose of identifying said vehicle, and said stored program providing the information concerning the position of the fuel tank inlet of the vehicle identified by said driver through his actuation of appropriately selected pushbuttons.

44. The control mechanism of claim 41 wherein said means for identifying the vehicle to be fueled comprises an appropriate card reader into which a suitable identification card may be inserted, said card reader being electrically connected to said operative means for the communication of identification information to said control mechanism.

45. The control mechanism of claim 41 wherein said means for determining the type and the amount of fuel comprises a panel containing a first set of pushbuttons, a second set of pushbuttons, a means for paying for the fuel to be used, a means for indicating the amount of fuel dispensed, a means for indicating the price of the fuel dispensed, and adjustable dial and a third set of pushbuttons, each pushbutton of said first set of pushbuttons corresponding to and representing a grade of fuel, each pushbutton of said second set of pushbuttons corresponding to and representing a particular quantity of fuel, said dial corresponding to and being employed by the driver of the vehicle to be fueled for the selection of a blend of fuel, a first pushbutton of said third set of pushbuttons corresponding to and representing a start button, a second pushbutton of said third set of pushbuttons corresponding to and representing a stop button, appropriate pushbuttons and dials being actuated by said driver for the selection of the amount and the type of fuel, said start button being actuated by said driver to start the fueling of said vehicle by said driver after the selection of the type and the amount of fuel, and payment have been completed, said stop button being actuated by said driver where such stoppage is deemed to be desirable and necessary, said panel being located upon a console, all push buttons being directly connected to electrical switches, each pushbutton being connected to a separate and different electrical switch, and said electrical switches, said means for paying for the fuel to be used, said means for indicating the amount of fuel, said means for indicating the price of the fuel, and said adjustable dial being electrically connected to said operative means, said operative means being adapted to operate an associated fuel pump in delivering the correct amount of fuel selected by said driver.

46. The control mechanism of claim 45 wherein said means for paying for the fuel comprises a money acceptor, said money acceptor being capable of searching, identifying and verifying the money inserted and actuating a computing mechanism to count the money inserted and to determine whether any money is to be returned to said driver, and returning the determined change to said driver.

47. The control mechanism of claim 45 wherein said means for paying for the fuel is a means for the insertion of a credit card, whereby an appropriately encoded credit card is inserted and validated and the price of the dispensed fuel is appropriately registered in the name of the purchaser.

48. The control mechanism of claim 45 wherein said means for paying for the fuel comprises a money acceptor and a means for the insertion of a credit card.

49. The control mechanism of claim 41 wherein said numerical control means comprises:
 a. at least one motor selecting means, said motor selecting means being electrically connected to said operative means for the transmission of signals from said stored program through said operative means to said motor selecting means;
 b. a plurality of motor means, each of said motor means being electrically connected to one of said motor selecting means, said motor selecting means selecting the appropriate motor means as directed by said stored program so that the selected motor means can be activated;
 c. a plurality of mechanical elements, each of said mechanical elements being mechaincally connected to a different motor means and being driven by the connected motor means;
 d. a plurality of measuring transducer means, each of said measuring transducer means being associated with a different mechanical element;
 e. a counting means, said counting means being electrically connected to said measuring transducer means for the transmission of signals from said measuring transducer means, said signal being transmitted from said measuring transducer means to said counting means indicating the extent of movement of the appropriate mechanical element, said counting means being electrically connected to said operative means for the transmission of signals from said stored program through said operative means to said counting means to indicate the extent of movement prescribed for said appropriate mechanical element; and
 f. a motor controlling means, said motor controlling means being electrically connected to said counting means for the transmission of signals from said counting means to said motor controlling means informing said motor controlling means how the selected motor means should be operated, said motor controlling means being electrically connected to said operative means for the transmission of signals from said stored program through said operative means to said motor controlling means informing said motor controlling means as to the desired direction of rotation of said selected motor means, said motor controlling means being electrically connected to said motor selecting means for the transmission of signals from said motor controlling means through said motor selecting means to said selected motor means in order to control said selected motor means as to speed and motion, and said counting means being electrically connected to said operative means for the transmission of signals from said counting means through said operative means to said stored program informing said stored program that said mechanical element has completed the desired movement, thus enabling said operative means to initiate the immediately subsequent operation.

50. The control mechanism of claim 41 wherein said numerical controller means comprises:
 a. at least one electrical selecting switch, said electrical selecting switch being electrically connected to said operative means for the transmission of signals from said stored program through said operative means to said electrical selecting switch;
 b. a plurality of electrical motors, each of said electrical motors being electrically connected to said electrical selecting switch, said electrical selecting switch selecting the electrical motor which is prescribed by said stored program to said electrical selecting switch so that the selected motor can be energized;

c. a plurality of mechanical elements, each of said mechanical elements being mechanically connected to a different electrical motor and being driven by the connected electrical motor;

d. a plurality of measuring transducers, each of said measuring transducers being associated with a different mechanical element;

e. a counter, said counter being sequentially electrically connected to each of said measuring transducers for the transmission of signals from said measuring transducers, said signals being transmitted from said measuring transducers to said counter indicating the extent of movement of the appropriate mechanical element, said counter being electrically connected to said operative means for the transmission of signals from said stored program through said operative means to said counter to indicate the extent of movement prescribed for the appropriate mechanical element; and f. a motor controller, said motor controller being electrically connected to said counter for the transmission of signals from said counter to said motor controller, informing said motor controller as to the starting, speed and stopping of the appropriate electrical motor, said motor controller being electrically connected to said operative means for the transmission of signals from said stored program through said operative means to said motor controller informing said motor controller as to the desired direction of rotation of said appropriate electrical motor, said motor controller being electrically connected to said electrical selecting switch for the transmission of signals from said motor controller through said electrical selecting switch to said appropriate electrical motor in order to control said appropriate electrical motor as to speed and motion, said counter being electrically connected to said operative means for the transmission of signals from said counter through said operative means to said stored program informing said stored program that said appropriate mechanical element has completed the desired movement, thus enabling said operative means to initiate the immediately subsequent operation.

51. The control mechanism of claim 41 wherein said numerical control means and said means associated with said program direct the following operations in sequence: to locate the fuel tank inlet, to move the fuel-dispensing head to said inlet, to open any associated flap, to open said inlet, to insert the associated nozzle into said inlet, to detect that said nozzle is in fact inserted in said inlet, to dispense the fuel, to stop flow of fuel when the desired amount of fuel has been dispensed or the fuel tank has become full, to withdraw said nozzle, to close said inlet, to close any associated flap, and to return said fuel-dispensing head to its original position.

52. The control mechanism of claim 41 wherein said stored program is stored on rotary cylindrical mechanical controllers.

53. The control mechanism of claim 41 wherein said stored program is stored on punched cards.

54. The control mechanism of claim 41 wherein said stored program is stored on a punched tape.

55. The control mechanism of claim 41 wherein said stored program is stored on a magnetic tape.

56. The control mechanism of claim 43 wherein said third panel contains a fourth set of pushbuttons and a fifth set of pushbuttons, said fourth set of pushbuttons corresponding to and representing the models of a vehicle and said fifth set of pushbuttons corresponding to and representing the body styles of a vehicle, a designation for each pushbutton in said fourth set and said fifth set being located adjacent to said particular pushbutton, the designation for the pushbuttons in said fourth set and said fifth set being mounted so that different designations may appear adjacent to the pushbuttons of said fourth set and said fifth set, said different designations being selected and controlled by the actuated pushbuttons of said first panel and said second panel.

57. A control mechanism including a numerical control means having a stored program and operative means for use in a system, for automatically fueling an automotive vehicle having a tank with an inlet cap and a covering flap which comprises:

a. means for identifying the vehicle that is to be fueled, said means for identifying the vehicle comprising a plurality of panels, said panels being mounted on an elevated rotatable console and including a first panel which contains a first set of pushbuttons, each pushbutton of the first set of pushbuttons corresponding to and representing a particular model year of a vehicle; a second panel which contains a second set of pushbuttons, each pushbutton of said second set of pushbuttons corresponding to and representing a particular manufacturer of automotive vehicles, and a third panel which contains a third set of pushbuttons, each pushbutton of said third set of pushbuttons corresponding to and representing a particular model and body style of a vehicle, each of said panels having a legend associated therewith to indicate the function of the set of pushbuttons located thereon, a designation of what a particular pushbutton represents being located adjacent to said particular pushbutton, the designations for the pushbuttons of said third set of pushbuttons being mounted on a scroll-type means, said scroll-type means being capable of being advanced so that different designations may appear opposite the pushbuttons of said third set of pushbuttons, said different designations being selected and controlled by the actuated pushbuttons of said first set of pushbuttons and of said second set of pushbuttons, all pushbuttons being directly connected to electrical switches, each pushbutton being associated with a different, separate electrical switch, each of said electrical switches being electrically connected to said operating means, said pushbuttons being actuated by a person for the purpose of identifying said vehicle, and said stored program providing the information concerning the position of the fuel tank inlet of the vehicle identified by said person through the actuation of appropriately selected pushbuttons;

b. means for determining the type and the amount of the fuel desired, said means for determining the type and the amount of fuel comprising a fourth panel which contains a fourth set of pushbuttons, a fifth set of pushbuttons, a means for paying for the fuel to be used, a means for indicating the amount of fuel dispensed, a means for indicating the price of the fuel dispensed, an adjustable dial and a sixth set of push buttons, each pushbutton of said fourth set of pushbuttons corresponding to and representing a grade of fuel, each pushbutton of said fifth set of pushbuttons corresponding to and representing a particular quantity of fuel, said dial corresponding to and being employed by said person for the selection of a blend of fuel, a first pushbutton of said sixth set of pushbuttons corresponding to and representing a starter, a second pushbutton of said sixth set of pushbuttons corresponding to and representing a stop button, appropriate pushbuttons and dials being actuated by said person for the selection of the amount and the type of fuel, said start button being actuated by said person to start the fueling of said vehicle by said person after the selection of the type and the amount of the fuel, and payment have been completed, said stop button being actuated by said person where such stoppage is deemed to be desirable and necessary, said fourth panel being located upon said console, all pushbuttons on said fourth panel being directly connected to electrical switches, each pushbutton being connected to a separate and different electrical switch, and said electrical switches, said means for paying for the fuel to be used, said means for indicating the amount of fuel, said means for indicating the price of the fuel, and said adjustable dial all being electrically connected to said operative means, said stored program being adapted to supply information through said operative means for the operation of an associated fuel pump in delivering the correct amount of fuel selected by said person; and c. numerical control means, said numerical control means comprising the stored program of guidance control information, indicating the position of the fuel tank inlet in said vehicle, and operative means associated with said stored program and responsive thereto for selectively actuating and automatically controlling the guidance and operative movements of a fuel-dispensing head having an associated nozzle, a flap opening and closing means, and cap removing and replacing means, said means for identifying the vehicle being electrically connected to said operative means, said means for determining the type and the amount of fluid being electrically connected to said numerical control means, said operative means associated with said stored program comprising at least one electrical selecting switch, said electrical selecting switch being responsive to said stored program for the transmission of signals from said stored program to said electrical selecting switch, a plurality of electrical motors, each of said electrical motors being electrically connected to said electrical selecting switch, said electrical selecting switch selecting the electrical motor which is prescribed by said stored program to said electrical selecting switch so that the selected motor can be energized, a plurality of mechanical elements, each of said mechanical elements being mechanically connected to a different electrical motor and being driven by the connected electrical motor, a plurality of measuring transducers, each of said measuring transducers being associated with a different mechanical element, a counter, said counter being sequentially electrically connected to each of said measuring transducers for the transmission of signals from said measuring transducers, said signals being transmitted from said measuring transducers to said counter indicating the extent of movement of the appropriate mechanical element, said counter being electrically connected to said operative means for the transmission of signals from said stored program through said operative means to said counter to indicate the extent of movement prescribed for the appropriate mechanical element; and a motor controller, said motor controller being electrically connected to said counter for the transmission of signals from said counter to said motor controller, informing said motor controller as to the starting, speed, and stopping of the appropriate electrical motor, said motor controller being electrically connected to said operative means for the transmission of signals from said stored program through said operative means to said motor controller, informing said motor controller as to the desired direction of rotation of said appropriate electrical motor, said motor controller being electrically connected to said electrical selecting switch for the transmission of signals from said motor controller through said electrical selecting switch to said appropriate electrical motor in order to control said appropriate electrical motor as to speed and motion, said counter being electrically connected to said operating means for the transmission of signals from said counter through said operative means to said stored program informing said stored program that said appropriate mechanical element has completed the desired movement, thus enabling said stored program to initiate the immediately subsequent operation, said numerical control means and said operative means associated with said stored program directing at least the following operations in sequence: to locate the fuel tank inlet, to move the fuel-dispensing head to said inlet, to insert the associated nozzle into said inlet, to dispense the fuel, and to withdraw said nozzle.

58. The control mechanism of claim 57 wherein said numerical control means and said operative means direct the following operations in sequence: to locate the fuel tank inlet, to move the fuel-dispensing head to said inlet, to open any associated flap, to open said inlet, to insert the associated nozzle into said inlet, to detect that said nozzle is in fact inserted in said inlet, to dispense the fuel, to stop flow of fuel when the desired amount of fuel has been dispensed or the fuel tank has become full, to withdraw said nozzle, to close said inlet, to close any associated flap, and to return said fuel-dispensing head to its orignal position.